United States Patent
Har et al.

(10) Patent No.: US 6,446,145 B1
(45) Date of Patent: Sep. 3, 2002

(54) COMPUTER MEMORY COMPRESSION ABORT AND BYPASS MECHANISM WHEN CACHE WRITE BACK BUFFER IS FULL

(75) Inventors: David Har, Briarcliff Manor, NY (US); Charles O. Schulz, Ridgefield, CT (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,556

(22) Filed: Jan. 6, 2000

(51) Int. Cl.⁷ .............................................. G06F 13/00
(52) U.S. Cl. ........................ 710/68; 714/68; 711/170; 711/154; 711/156; 711/143; 711/203; 711/206
(58) Field of Search ................................ 711/170, 171, 711/173, 138, 118, 143, 154, 155, 156, 203, 206, 207, 215, 202; 710/68, 54, 57, 39, 40, 43, 18, 19; 714/48

(56) References Cited

U.S. PATENT DOCUMENTS

| | | | | |
|---|---|---|---|---|
| 5,210,829 A | * | 5/1993 | Bitner | 710/57 |
| 5,357,614 A | * | 10/1994 | Pattisam et al. | 710/68 |
| 5,459,849 A | * | 10/1995 | Bergkvist, Jr. et al. | 711/3 |
| 5,490,260 A | * | 2/1996 | Miller et al. | 711/100 |
| 5,632,012 A | * | 5/1997 | Belsan et al. | 714/6 |
| 5,664,148 A | * | 9/1997 | Mulla et al. | 711/138 |
| 5,671,389 A | * | 9/1997 | Saliba | 711/111 |
| 5,699,539 A | * | 12/1997 | Garber et al. | 711/2 |
| 5,715,424 A | * | 2/1998 | Jesionowski et al. | 714/24 |
| 5,812,817 A | | 9/1998 | Hovis | 711/173 |
| 5,930,167 A | * | 7/1999 | Lee et al. | 365/185.03 |

* cited by examiner

*Primary Examiner*—Hong Kim
(74) *Attorney, Agent, or Firm*—Scully, Scott, Murphy & Presser; Derek S. Jennings

(57) ABSTRACT

In a processing system having a main memory wherein information is stored in a compressed format for the purpose of gaining additional storage through compression efficiencies, a method and apparatus for enabling termination of a pending compression operation for the purpose of writing the data directly to the main memory, bypassing the compressor hardware during stall conditions. Memory space (compressibility) is sacrificed for higher system performance during these temporary write back stall events. A background memory scrub later detects and recovers the "lost" compressibility by recycling the uncompressed data back through the compressor during idle periods.

21 Claims, 5 Drawing Sheets

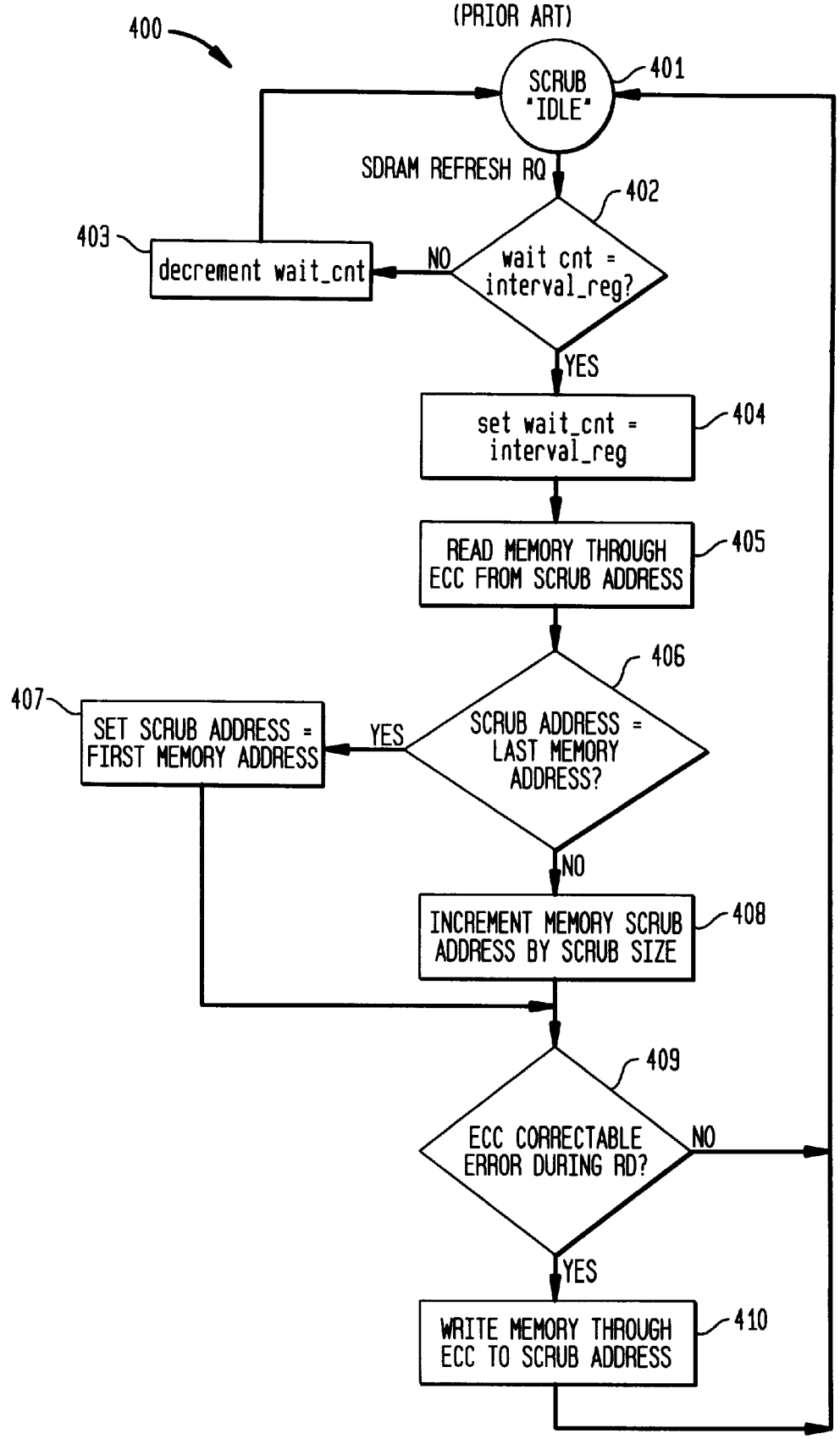

COMPUTER MEMORY COMPRESSION ABORT AND BYPASS MECHANISM WHEN CACHE WRITE BACK BUFFER IS FULL

BACKGROUND OF THE INVENTION

1. Field of the Invention

The present invention relates in general to the field of compressed memory architecture in computer systems, and more specifically, to an improved method and apparatus for operating a main memory compressor.

2. Discussion of the Prior Art

Computer systems generally consist of one or more processors that execute program instructions stored within a medium. This mass storage medium is most often constructed of the lowest cost per bit, yet slowest storage technology, typically magnetic or optical media. To increase the system performance, a higher speed, yet smaller and more costly memory, known as the main memory, is first loaded with information from the mass storage for more efficient direct access by the processors. Even greater performance is achieved when a higher speed, yet smaller and more costly memory, known as a cache memory, is placed between the processor and main memory to provide temporary storage of recent/and or frequently referenced information. As the difference between processor speed and access time of the final storage increases, more levels of cache memory are provided, each level backing the previous level to form a storage hierarchy. Each level of the cache is managed to maintain the information most useful to the processor. Often more than one cache memory will be employed at the same hierarchy level, for example, when an independent cache is employed for each processor. Cache memory systems have evolved into quite varied and sophisticated structures, but always address the tradeoff between speed and both cost and complexity, while functioning to make the most useful information available to the processor as efficiently as possible.

Recently, cost reduced computer system architectures have been developed that more than double the effective size of the main memory by employing high speed compression/decompression hardware based on common compression algorithms, in the path of information flow to and from the main memory. Processor access to main memory within these systems is performed indirectly through the compressor and decompressor apparatuses, both of which add significantly to the processor access latency costs.

Referring now to FIG. 1, a block diagram of a prior art computer system 100 is shown. The computer system includes one or more processors 101 connected to a common shared memory controller 102 that provides access to a system main memory 103. The shared memory controller contains a compressor 104 for compressing fixed size information blocks into as small a unit as possible for ultimate storage into the main memory, a decompressor 105 for reversing the compression operation after the stored information is later retrieved from the main memory, and write queue 113 for queuing main memory store request information block(s) destined for the compressor. The processor data bus 108 is used for transporting uncompressed information between other processors and/or the shared memory controller. Information may be transferred to the processor data bus 108 from the main memory 103, either through or around the decompressor 105 via a multiplexor 111. Similarly, information may be transferred to the main memory 103 from the processor data bus 108 to the write buffer and then either through or around the compressor 104 via a multiplexor 112.

The main memory 103 is typically constructed of dynamic random access memory (DRAM) with access controlled by a memory controller 106. Scrub control hardware within the memory controller can periodically and sequentially read and write DRAM content through error detection and correction logic for the purpose of detecting and correcting bit errors that tend to accumulate in the DRAM. Addresses appearing on the processor address bus 107 are known as Real Addresses, and are understood and known to the programming environment. Addresses appearing on the main memory address bus 109 are known as Physical Addresses, and are used and relevant only between the memory controller and main memory DRAM. Memory Management Unit (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information, say 1024 bytes, by locating and replacing repeated byte strings within the block with a pointer to the first instance of a given string, and encoding the result according to a protocol. This process occurs through a bytewise compare over a fixed length and is paced by a compressor sequence counter, resulting in a constant completion time. The post process output data block ranges from just a few bytes to the original block size, when the compressor could not sufficiently reduce the starting block size to warrant compressing at all. The decompressor 105 functions by reversing the compressor operation by decoding resultant compressor output block to reconstruct the original information block by inserting byte strings back into the block at the position indicated by the noted pointers. Even in the very best circumstances, the compressor is generally capable of only ¼–½ the data rate bandwidth of the surrounding system. The compression and decompression processes are naturally linear and serial too, implying quite lengthy memory access latencies through the hardware.

Referring to FIG. 2, there is illustrated a prior art main memory partitioning scheme 200. The main memory 205 is a logical entity because it includes the processor(s) information as well as all the required data structures necessary to access the information. The logical main memory 205 is physically partitioned from the physical memory address space 206. In many cases the main memory partition 205 is smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array. In any case, when implemented the cache controller will request accesses to the main memory in a similar manner as a processor would if the cache were not present. Although it is typical for a large cache to be implemented between the processor(s) and main memory for the highest performance, it is not required, and is beyond the scope of the invention.

The logical main memory 205 is partitioned into the sector translation table 202, with the remaining memory being allocated to sector storage 203 which may contain compressed, uncompressed, free sector pointers, or any other information as long as it is organized into sectors 204. The sector translation table region size varies in proportion to the real address space size which is defined by a programmable register within the system. Particularly, equation 1) governs the relation of the sector translation table region size as follows:

$$\text{sector\_translation\_table\_size} = \frac{\text{real\_memory\_size}}{\text{compression\_block\_size}} \cdot \text{translation\_table\_entry\_size} \quad 1)$$

Each entry is directly mapped to a fixed address range in the processor's real address space, the request address being governed in accordance with equation 2) as follows:

$$\text{STT\_entry\_address} = \left(\left(\frac{\text{real\_address}}{\text{compression\_block\_size}}\right) \cdot \text{translation\_table\_entry\_size}\right) + \text{cache\_region\_size} \quad 2)$$

For example, a mapping may employ a 16 byte translation table entry to relocate a 1024 byte real addressed compression block, allocated as a quantity 256 byte sectors, each located at the physical memory address indicated by a 25-bit pointer stored within the table entry. The entry also contains attribute bits 208 that indicate the number of sector pointers that are valid, size, and possibly other information.

Every real address reference to the main memory causes memory controller to reference the translation table entry 207 corresponding to the real address block containing the request address. For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory. However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors. There are many possible variations on this translation scheme, but all involve a region of main memory mapped as a sector translation table and a region of memory mapped as sectors. Storage of these data structures in the DRAM based main memory provides the highest performance at the lowest cost, as well as ease of reverting the memory system into a typical direct mapped memory without compression and translation.

Large high speed cache memories are implemented between the processor and the compressor and decompressor hardware to reduce the frequency of processor references to the compressed memory, mitigating the effects the high compression/decompression latency. These caches are partitioned into cache lines, equal in size to the fixed information block size required by the compressor and decompressor. Since a cache is smaller than the next level of memory in the hierarchy, it must be continuously updated to contain only information deemed useful to the processors. Often the process of replacing information within the cache results in a cache line having to be written back to the main memory through the compressor. At times, these write back events can occur in rapid succession, thereby backing up behind one another until the processors stall for access to the cache. This situation is exacerbated when a compressor operates at bandwidths lower than that of the surrounding system data flow components.

Therefore, the need has arisen for an improved method of data management in a compressed memory system, without significant cost or complexity, to minimize processor stall conditions due to cache write back queuing at the compressor.

SUMMARY OF THE INVENTION

It is an object of the invention to provide a data management mechanism in a compressed memory system that functions to minimize processor stall conditions due to cache write back queuing at the compressor.

It is a further object of the invention to provide a method and apparatus that implements an escape mechanism for aborting a pending write back compression in order to bypass the compressor hardware when a stall situation occurs. This mechanism temporarily sacrifices memory space (compressibility) when system performance would be adversely affected during write back queue full events.

According to the invention, an abort logic signal is asserted by a cache controller mechanism to the compressor hardware when the cache write back queue, which feeds the compressor, is full and a new write back condition exists within the cache. If the compressor is nearly complete with a pending write back compression, then the signal is ignored, and the current compression is allowed to complete. Otherwise, the write-back compression is aborted, and the pending write back data is immediately written back to the main memory, bypassing the compressor. Other write back operation(s) queued behind the one pending at the compressor remain unaffected by the abort signal. Further, a compressible state bit is set in the compression translation entry associated with the write back to indicate that the information may be compressible, even though it is stored in an uncompressed format. A special process running in conjunction with the main memory scrub background task is provided for detecting the potentially compressible information blocks. Once such a block is detected and the write back queue is below a predetermined threshold, then the uncompressed block is read back from the main memory and placed into the write back queue to be reprocessed through the compressor and restored into the main memory with the associated compressible state bit reset. This prevents the memory from accumulating uncompressed information blocks that would otherwise be compressible, resulting in a reduction in available memory.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
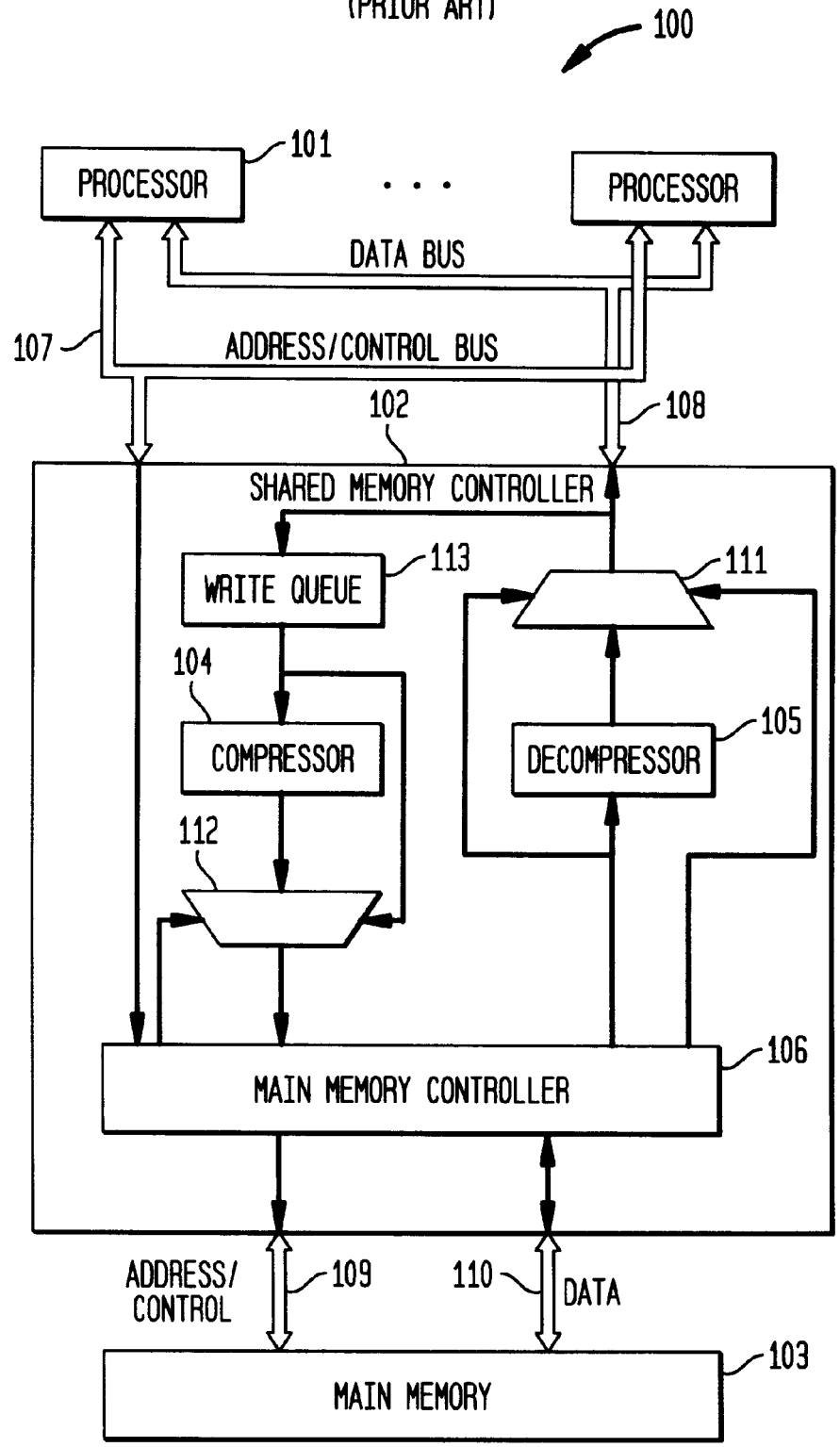
FIG. 1 illustrates a block diagram of a prior art computer having a cache and a main memory system with hardware compressor and decompressor.
Figure 2:
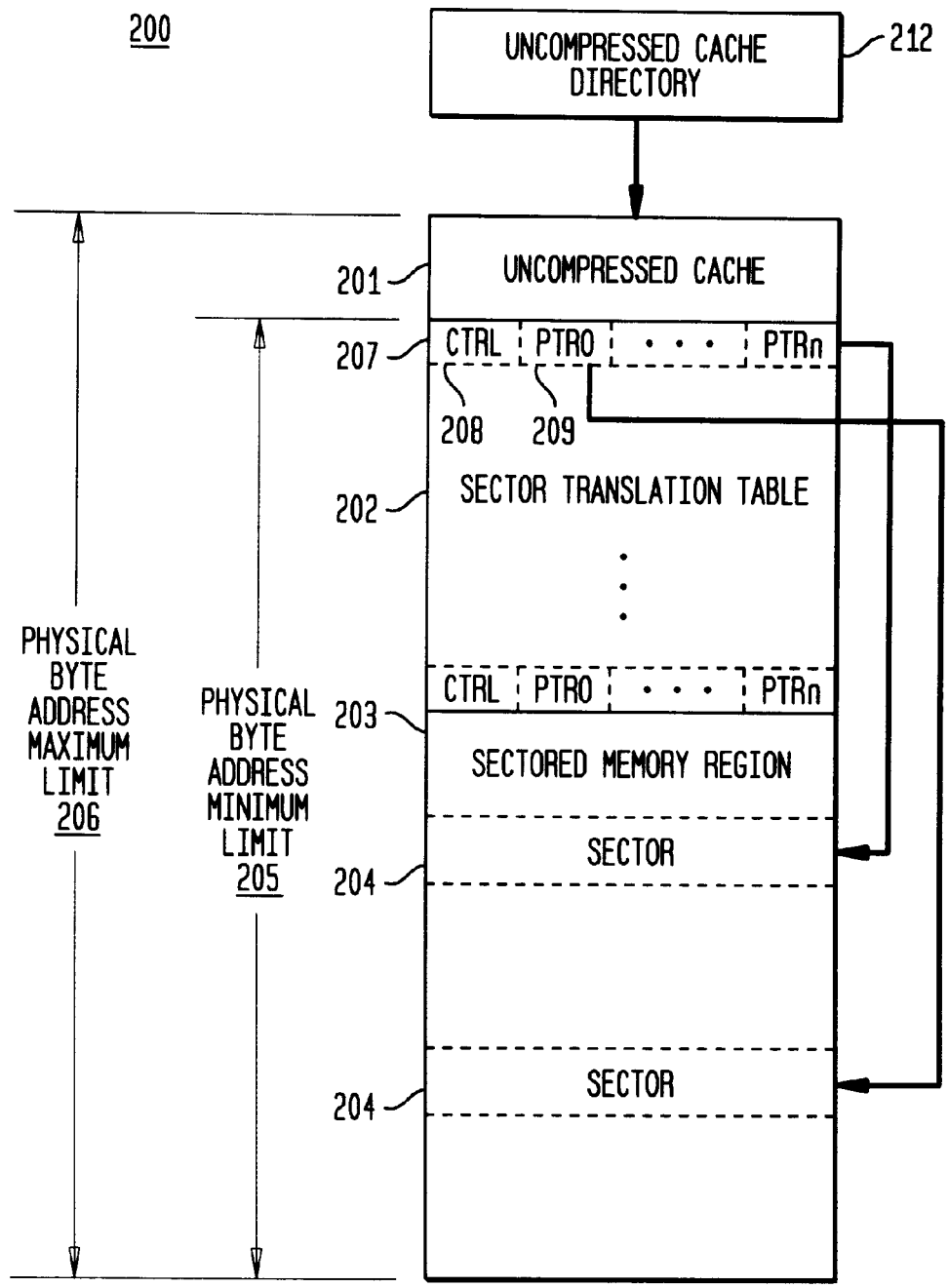
FIG. 2 illustrates a prior art scheme for partitioning a memory address space.
Figure 3:
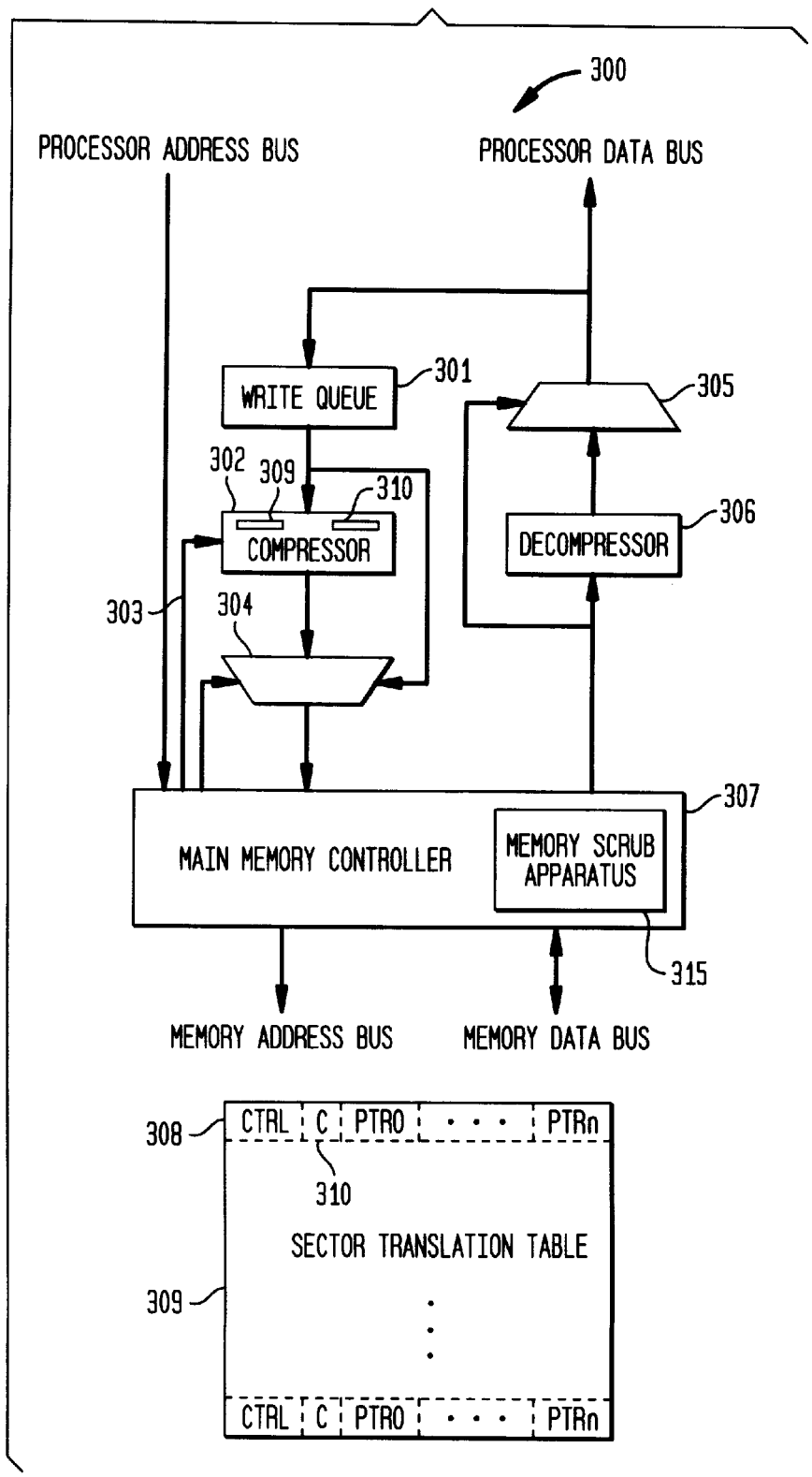
FIG. 3 illustrates the apparatus according to the principals of the present invention.

Referring to FIG. 3 there is illustrated an improved apparatus 300 that permits a main memory write access demand based compressor bypass, and background recompress of affected stored information. The compressor control logic 302 is modified to receive and process a new input logic signal 303 and new functional behavior when the signal is asserted. Particularly, when the input logic signal 303 is asserted by the memory/cache control logic 307, the compressor 302 will abort processing of a pending compression operation, provided the progress of the compression operation to that point, as measured by a compressor sequence counter 309 value, has not exceeded a predetermined threshold. Otherwise, the compressor will proceed normally to completion without interruption. This threshold may be fixed in the design of the compressor 302 or it may be programmable via a register 310, of which the contents are used within the compressor to determine the threshold. In either case, the compressor control logic 302 will abort a pending compression operation by simply reverting to the existing operative state which is normally entered only when the compressor determines that a compression will not yield any spatial benefit, and therefore the information block is stored to the main memory in an uncompressed format.

More particularly, the input logic signal may be asserted as an abort signal when the write queue 301 is in a state such that it cannot accept any more information, and the memory/cache control logic 307, which is responsible for adding write request information, needs to add the information associated with an additional write request.

Generally, this occurs when the cache controller needs to replace a line within the cache, and the displaced cache line content needs to be written back to the main memory The protocol for the abort signal 303 may be implemented in two ways: 1) the abort signal may be level sensitive, where it is asserted only during the few cycles when a new write back is attempted, after which the signal is asserted until the situation presents itself again; or, 2) the abort signal 303 may be latched, where once asserted, it remains asserted until some quantity of write back information block(s) are drained from the cache write back queue, bypassing the compressor.

Generally, the compressible, yet uncompressed information blocks will be read back from main memory for replacement in the cache, and thus have another opportunity to be compressed when the information block is again written back to main memory during a subsequent cache line replacement. However, under certain conditions it is possible for information blocks to not have subsequent opportunities to be recompressed. Thus, the system of the invention implements means for detecting such cases to facilitate an overt compression opportunity. When an information block is written to main memory that has bypassed the compressor in response to an abort signal assertion, then a compressible state bit 310 is asserted within the associated entry 308 within the sector translation table 309 (FIG. 3). This compressible state bit 310 is used to indicate that the information block may be compressible, but is not stored in the compressed format. This provides a means to later detect, through a background task described with respect to FIG. 4(b), which information blocks may be compressible for the purpose of gaining potential memory space that is otherwise not available.

Overtly causing the compressible, yet uncompressed information blocks to be compressed may be executed in several ways. In one embodiment, software is executed by the processor(s) that periodically, but infrequently read a part of an information block that occurs next in the linear sequence of all information blocks. A similar software program may periodically, yet infrequently read the entire sector translation table 309, for the purpose of detecting which entries 308 have the compressible state bit 310 asserted, and then read a part of only the information blocks associated with the detected entries. In a preferred embodiment however, a hardware mechanism is employed to perform the task. A special comparator is incorporated into the memory scrub apparatus 315 within the memory controller 307 to detect when the compressible state bit 310 is asserted during normal background scrub operations. When an entry 308 is detected in this condition, and the write queue fill condition is below a predetermined threshold, the memory controller reads the associated uncompressed information block from memory and places its own write in the write queue 301 through the read path multiplexor 305 and processor data bus, where it is processed in the normal manner as all write requests. If the write queue is not available, then the scrub controller ignores the detection and continues it normal activity.

Figure 4B:
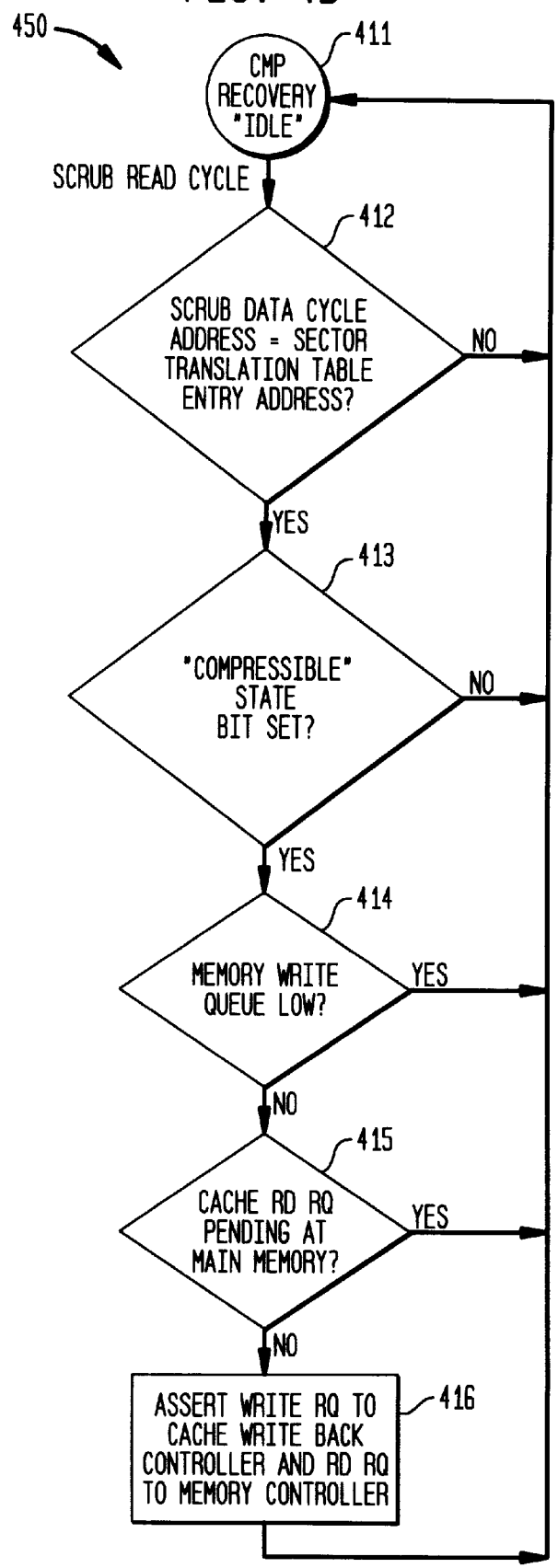
FIGS. 4, 4(*a*) & 4(*b*) illustrate respective state diagrams for the methods of memory scrub and the recovery of compressible, yet uncompressed blocks implemented in accordance with the apparatus of the present invention.

Referring now to FIG. 4(a), there is shown a state diagram 400 for typical memory scrub process according to the prior art. Memory scrub is a process of systematically reading every location of a DRAM over a period of time for the purpose of detecting accumulated storage errors. If a correctable error is detected by the Error Correction Code (ECC) circuits in the memory controller, the corrected data is written back to the DRAM through the ECC circuits to reestablish the data in memory without errors. Since DRAM soft errors accumulate slowly, the scrub process needs to complete a sweep of the DRAM over several tens of hours. Therefore, the scrub process operates in the idle state at step 401 until some infrequent periodic event, for example, some quantity of DRAM refreshes are detected at steps 402 and 403. At such detection, the scrub process initiates a scrub read to the next block of memory. Once out of the wait loop defined at steps 401, 402 403, a scrub event commences by first reinitializing the wait counter "wait_cnt" 404, to pace out the period to the next scrub. Then a block of data, say 256 bytes, is read from memory, at the scrub address contained within a counter, and checked through the ECC circuits 405. If the scrub address counter is equal to last memory address 406, then the counter is reinitialized with the first memory address at step 407. Otherwise, the counter is incremented to indicate the next scrub address at step 408. Any correctable errors detected in the scrub data block from step 405, would have been corrected by the ECC circuits before the data was stored into a temporary buffer. If there were any errors as indicated at step 409, then the corrected scrub data block would be written back to the main memory at step 410. Otherwise, the scrub process reverts back to the idle state 401. Referring now to FIG. 4(b), there is illustrated a state diagram 450 for detecting and recovering potentially compressible, yet uncompressed information blocks. This Compression Recovery Process (CMP) operates in conjunction with and is dependent on the memory scrub process 400 previously described and shown in FIG. 4(a), and the apparatus described with respect to FIG. 3. The CMP 450 effectively snoops Sector Translation Table 309 entries 308, for the presence of the "compressible" state bit 310 as they are read from main memory during normal a scrub process. The compression recovery process operates in the idle state 411 until a scrub read event commences at step 405 (as shown in FIG. 4(a)). If a scrub data address is equal to a sector translation table entry 412, and the "compressible" state bit 310 is asserted 413, and the memory write queue 301 is low 414, and there is no cache read request pending at the main memory 415, then a write request is asserted to the write back controller and a read request is asserted to the memory controller to read the uncompressed information and deposit it in the write queue 301 via the multiplexor 305. Otherwise, control is returned to the processor idle state at step 411.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer memory system implementing a processing device for enabling indirect storage and retrieval of compressed data in available address space in a physical memory associated with said computer and issuing real memory addresses for accessing information from said physical memory, and, including a compressor mechanism for compressing processor information into compressed information units, said compressor mechanism having associated write back queue for storing data to be compressed for storage in said physical memory, said memory system comprising:

a) a sectored storage region for exclusive storage of compressed data in fixed length storage sectors and having an associated sector translation lookup table (STT) including fixed length entries for mapping said real memory addresses to data storage locations within said physical memory, said compressor mechanism connected to said sectored storage region and said processing device; and, b) a memory control device for comparing occupancy state of said write back queue and asserting a control signal when said occupancy state indicates a full write back queue and another cache write back is initiated, said compressor mechanism responsive to said control signal for either aborting a pending compression operation of data when a progression status of a pending data compression operation has not exceeded a data compression sequence threshold, and enabling direct storage of said data in an uncompressed state in said sectored storage region of said physical memory, or enabling said pending data compression operation to complete when a progression status of said pending data compression sequence has exceeded said data compression sequence threshold.

2. The system as claimed in claim 1, further comprising a device
   for tracking progression of a pending compression operation, said memory control device additionally including mechanism for comparing a progression status of said pending data compression operation against a user-defined data compression sequence threshold, and enabling said pending data compression operation to complete when said data compression sequence threshold has been exceeded, and aborting said pending compression operation of data when said user-defined data compression sequence threshold has not been exceeded.

3. The system as claimed in claim 2, wherein said memory control device additionally includes a logic register for setting said data compression sequence threshold.

4. The system as claimed in claim 2, wherein said memory system tracking device comprises a compressor sequence counter, said progression status including a compressor sequence counter value for progression status comparison.

5. The system as claimed in claim 2, further comprising:
   a cache memory array device having a plurality of cache lines;
   a cache directory device, associated with said cache memory array device, for storing address tag information associated with the data stored in said cache memory array;
   a cache line write back means, associated with said cache memory array, for performing a cache line fill operation by requesting and removing existing cache line data and replacing removed data with different data via a cache line write back operation, and updating said directory device with new address tag information, wherein said control signal is asserted by said memory control device during a cache write back request when existing cache line data is to be written back to said physical memory through said compressor.

6. The system as claimed in claim 2, wherein said table entries of said STT includes a flag associated with data blocks stored in said sectored storage region for storing uncompressed data, said memory control device further comprising mechanism for setting said flag to indicate subsequent compressability of said data stored in uncompressed format as a result of an aborted pending compression operation.

7. The system as claimed in claim 6, further comprising:
   logic mechanism for periodically implementing memory scrub operation for reading and writing to said physical memory for the purpose of detecting data storage errors therein; and
   means operable in conjunction with said logic mechanism for detecting said state sector translation table entries during memory scrub, said detected entries including detection of said
   said flag indicating potentially compressible state of said stored data in uncompressed format.

8. The system as claimed in claim 6, wherein said memory control device further comprises:
   means for performing a memory read and write access for accessing said stored information in uncompressed format and writing said stored information through said compressor write queue and depositing said stored information in uncompressed format in said write back queue wherein, said memory read and write access performed in response to detecting a set flag indicating potentially compressible state of said stored data in uncompressed format.

9. The system as claimed in claim 8, wherein said means for performing a memory read access and memory write access further determines occupancy state of said write back queue, and initiates said memory write access when said write back queue occupancy state is low.

10. The system as claimed in claim 8, wherein said means for initiating a memory read access and memory write access further determines if a cache read request is pending, and initiates said memory write access when no cache read request is pending.

11. The system as claimed in claim 8, further including a decompressor mechanism for reversing compressed information units to make said processor information available to said processing system, said memory control device write access depositing said stored information in uncompressed format in said write back queue while bypassing said decompressor mechanism.

12. A method for avoiding a stalled computer memory operation performed in a system implementing a processing device for enabling indirect storage and retrieval of compressed data in available address space in a physical memory associated with said system and issuing real memory addresses for accessing information from said physical memory, a cache memory array having a plurality of cache lines, a cache line write back means, associated with the cache memory array for performing a cache line fill operation by requesting and removing existing cache line data and replacing removed data with different data via a cache line write back operation, and, including a compressor mechanism for compressing processor information into compressed information units, said compressor mechanism having associated write back queue for storing data to be compressed for storage in said physical memory, wherein said stalled computer memory operation includes a cache line write back request for storing cache line data back to said physical memory via said compressor mechanism said method comprising steps of:

comparing an occupancy state of said write back queue during a cache line write back request;

asserting a control signal when said occupancy state indicates a full write back queue and another cache write back is initiated; and, in response to said asserted control signal, either aborting a pending compression operation when a progression status of a pending data compression operation has not exceed a data compression sequence threshold, and storing data in an uncompressed format in said physical memory to enable processing of said cache line write back request, or enabling said pending data compression operation to complete when a progression status of said pending data compression operation has exceeded said data compression sequence threshold.

13. The method as claimed in claim 12, further including the steps of:

tracking progression of a pending compression operation;

comparing a progression status of said pending data compression operation against a user-defined data compression sequence threshold; and, enabling said compression operation to complete when said user-defined data compression sequence threshold has not been exceeded, and aborting said pending compression operation of data when said user-defined data compression sequence threshold has been exceeded.

14. The method as claimed in claim 13, wherein said computer system includes a compressor sequence counter for tracking compression status of a compression operation, said comparing step further including the step of obtaining a compressor sequence counter value from said compressor sequence counter.

15. The method as claimed in claim 12, wherein said physical memory includes a sectored storage region for exclusive storage of compressed data in fixed length storage sectors and having an associated sector translation lookup table (STT) including fixed length entries for mapping said real memory addresses to data storage locations within said physical memory, said compressor mechanism connected to said sectored storage region and said processing device, wherein said data is stored in said uncompressed format state in said sectored storage region of said physical memory, said method further including the step of: setting a flag in a STT entry associated with data blocks stored in said sectored storage region for indicating storage of potentially compressible data stored in uncompressed format resulting from an aborted pending compression operation.

16. The method as claimed in claim 15, further comprising the step of:

periodically implementing memory scrub operation for reading and writing to said physical memory for the purpose of detecting data storage errors therein; and in conjunction with said memory scrub operation, detecting those state sector translation table entries having said flag indicating potentially compressible state of said stored data in uncompressed format.

17. The method as claimed in claim 16, further comprising the steps of:

accessing said stored information in uncompressed format in said sectored storage region in response to detecting a set flag; and, writing said stored information through said compressor write back queue and depositing said stored information in uncompressed format in said write back queue for subsequent compression operation.

18. The method as claimed in claim 17, wherein prior to said step of writing said stored information through said compressor write back queue, the steps of:

determining the occupancy state of said write back queue; and, initiating said memory write back when said write back queue occupancy is low.

19. The method as claimed in claim 17, wherein prior to said accessing step, the steps of:

determining if a cache read request is pending; and, initiating said memory access and write back when no cache read request is pending.

20. In a processing system having a main memory wherein information is stored in a compressed format for the purpose of gaining additional storage through compression efficiencies, a method for enabling termination of a pending compression operation for the purpose of writing the data directly to the main memory, bypassing the compressor hardware during stall conditions, said method comprising:

comparing an occupancy state of a write back queue associated with a compressor device for temporarily storing uncompressed data to be compressed; and, asserting a control signal when said occupancy state indicates a full write back queue and another cache write back is initiated, said compressor device mechanism responsive to said control signal for either aborting a pending compression operation of data when a progression status of a pending data compression operation has not exceeded a data compression sequence threshold, and enabling direct storage of said data in an uncompressed state in said main memory, or enabling said pending data compression operation to complete when a progression status of said pending data compression operation has exceeded said data compression sequence threshold.

21. The method according to claim 20, further including the step of: recycling stored uncompressed data resulting from an aborted compressor operation back through the compressor device during idle periods of processing system operation.

* * * * *